No. 792,626. PATENTED JUNE 20, 1905.
J. H. STEPHENS.
HOSE COUPLING.
APPLICATION FILED MAY 3, 1904.
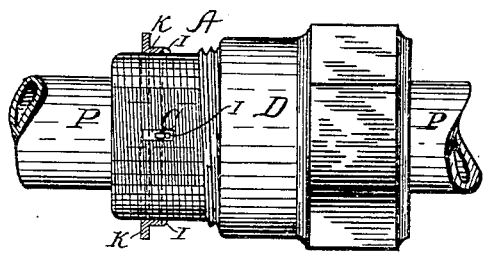
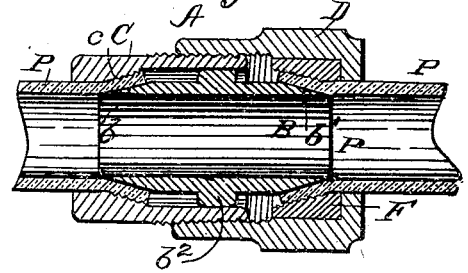
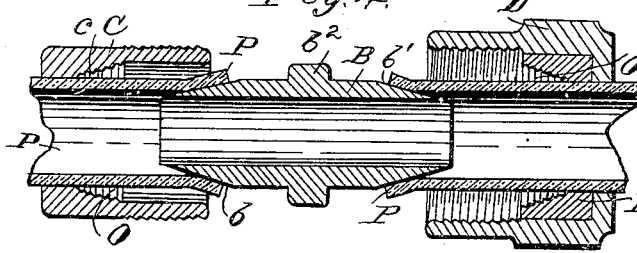
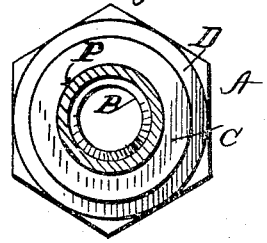
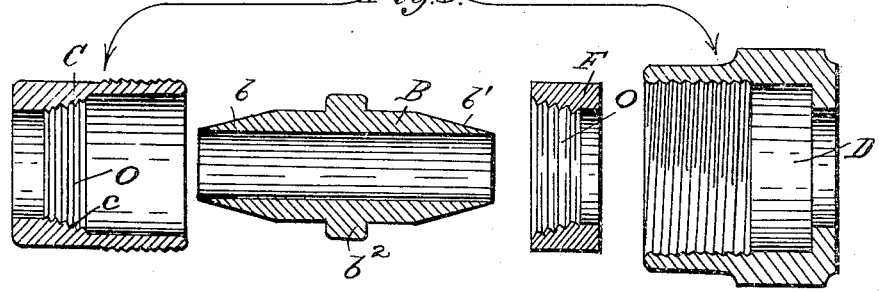
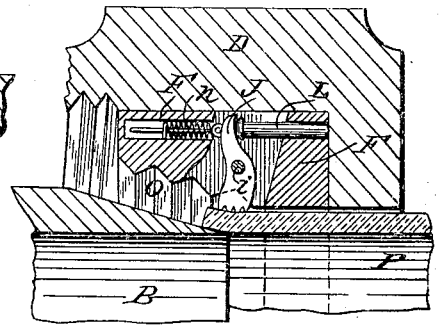
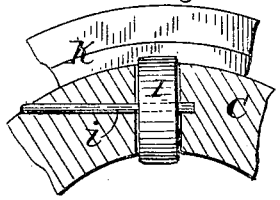
Witnesses.
Ezra Nat. Hill
Fred B. Bradford
Inventor.
John H. Stephens.
by W. Rees Edelen
Atty No. 792,626. Patented June 20, 1905.

UNITED STATES PATENT OFFICE.

JOHN H. STEPHENS, OF VERNON, TEXAS.

HOSE-COUPLING.

SPECIFICATION forming part of Letters Patent No. 792,626, dated June 20, 1905.

Application filed May 3, 1904. Serial No. 206,101.

*To all whom it may concern:*

Be it known that I, JOHN H. STEPHENS, a citizen of the United States, residing at Vernon, in the county of Wilbarger and State of Texas, have invented new and useful Improvements in Hose-Couplings, of which the following is a specification.

This invention has reference to improvements in hose-couplings; and it consists of certain novel features of construction which will be fully described in the specification, elucidated in the drawings, and fully pointed out in the claims.

The object of the present invention is to provide a hose-coupling that will be light, durable, and extremely simple in its construction, and at the same time meet all the requirements that such an invention calls for.

The present invention is so constructed and arranged that it can be operated in connecting the ends of a hose simultaneously by merely turning one sleeve upon an opposing sleeve, which draws both ends of the hose on the tapering shell, and thus securing a hose to its coupling. It is also arranged that lugs are employed for drawing the hose on the inclined shell step by step.

The coupling consists of a shell which is tapering on its opposite ends for the reception of a hose. On the left-hand side of the shell is a sleeve of varied diameter internally and which is provided with four dogs. On the inside of said sleeve is a tapering portion having corrugations thereon. The external portion of said sleeve is screw-threaded for the reception of a larger sleeve. Inside of the sleeve is a follower which is inclined or tapering, having corrugations on said inclines for clamping the ends of a hose when the sleeves are drawn toward each other through the medium of their respective screw-threads.

In the drawings similar letters of reference indicate like parts in all the figures.

Figure 1 is an elevation of my improved hose-coupling with a portion of a hose in the opposite ends of said coupling. Fig. 2 represents the coupling in longitudinal section having a hose secured therein. Fig. 3 represents an end elevation looking from the left-hand side of Fig. 1. Fig. 4 represents a longitudinal section of the device with the hose ends in position ready for clamping. Fig. 5 represents all the parts of the coupling in alinement with each other and disassembled. Fig. 6 represents an exaggerated view of a portion of the left-hand sleeve having a pivoted dog therein and a sleeve or ring on said dog. Fig. 7 represents the large sleeve with the follower therein provided with a dog and an operating-pin engaging the sleeve. Fig. 8 represents a portion of the sleeve indicated in Fig. 6, which is in section on line 8. Fig. 9 represents a portion of a coupling modified, having slides on the tapered ends of the shell which are adjustable.

This invention consists of the following parts, which when all combined together constitute a hose-coupling:

The letter A indicates the coupling.

B indicates the shell or that portion of the coupling that supports the free ends of a hose. The ends of this shell are tapering or inclined, as at $b$ and $b'$, so as to allow the ends of a hose to be forced on this incline or tapering ends of the shell B. It will be observed that the tapering ends of said shell B are very gradual or flat, for the reason that the resilience of the hose is not great enough to be forced over a very abrupt taper. Centrally located on the shell and integral with the same is an annular rib $b^2$ for supporting the end of a sleeve, which will be hereinafter fully described. The annular tapers or inclines on the opposite ends of the shell B are perfectly smooth, so as to afford a non-resisting surface as far as possible for the hose ends to be forced up to the proper position, as shown in Fig. 2 of the accompanying drawings.

Constituting part of this invention are two sleeves C and D, respectively. The object of these sleeves is for the purpose of clamping the hose ends against the shell B aforesaid. The sleeve C, which I constitute the small sleeve, is of varied internal diameter. Extending from the terminus of the small diameter and connecting with the larger diameter of this sleeve is an incline, which is annular. This incline $c$ is provided with annular serrations O for indenting the ends of the hose, so as to get a firm hold on them when clamping until they meet, when the sleeve D is turned by means of the nut forming part of said sleeve, when the sleeves are drawn toward each other, when the serrated inclines on the sleeve C and those on the follower F are forced tightly against the hose ends P, thus completing the coupling. To prevent the ends of the sleeve C from sagging when coupling the sleeves, I employ the annular rib $b^2$ to steady said sleeve.

Having described the invention, that which I desire to claim by Letters Patent of the United States is—

1. In a hose-coupling the combination with an internal shell and an external sleeve and an internal sleeve mounted thereon and movable longitudinally to said shell, the shell and sleeve being arranged to leave an annular space between their outer end portions to receive an end of hose, and dogs adapted to grip the hose ends mounted on said shell for the purpose as shown.

2. In a hose-coupling the combination with an internal shell and an external sleeve provided with a serrated incline mounted thereon and movable longitudinally to said shell, the shell and sleeve being arranged to leave an annular space between their outer end portions to receive an end of hose, and dogs adapted to grip the hose end mounted on said shell as specified.

3. In a hose-coupling the combination with an internal shell having inclines on its opposite ends, and an external sleeve mounted thereon and movable longitudinally to said shell, the shell and sleeve being arranged to leave an annular space between their outer end portions to receive an end of hose, and dogs adapted to grip the hose ends mounted on said shell as specified.

4. In a hose-coupling the combination with an internal shell and an external sleeve mounted thereon and movable longitudinally to said shell, the shell and sleeve being arranged to leave an annular space between their outer end portions to receive an end of hose, and dogs adapted to grip the hose ends pivoted to said external sleeve for the purpose as shown.

5. In a hose-coupling the combination with an internal shell and an external sleeve mounted thereon and movable longitudinally to said shell, the shell and sleeve being arranged to leave an annular space between their outer end portions to receive an end of hose and dogs adapted to grip the hose ends pivoted to said external sleeve, and a device on said external sleeve to move said dogs into engagement with the hose ends as specified.

6. In a hose-coupling the combination with an internal shell and an external sleeve mounted thereon and movable longitudinally to said shell, the shell and sleeve being arranged to leave an annular space between their outer end portions to receive an end of hose and pivoted dogs having serrated faces and a spring connection secured thereto and adapted to grip and move forward the hose ends through the medium of a collar on said external sleeve for the purpose as shown and described.

7. In a hose-coupling the combination with an internal shell and a pair of external sleeves mounted thereon and connected to each other so as to be longitudinally adjustable, the internal shell and the external sleeves being so arranged as to leave an annular space between their end portions to receive the ends of hose, of dogs adapted to grip the hose-sections mounted on said shell and in said pair of sleeves, and the means for moving said dogs into gripping engagement with the hose ends through the medium of screw-threads on said pair of sleeves as specified.

8. In a hose-coupling the combination with an internal shell of a pair of external sleeves, the larger one being provided with a follower having serrations therein, said pair of sleeves mounted adjacent to said internal shell leaving an annular space between said shell and sleeves to receive the ends of hose, of dogs adapted to grip and move forward the opposing hose ends toward each other and the means for operating said dogs as shown.

In testimony whereof I have signed my name to this specification in the presence of two subscribing witnesses.

JOHN H. STEPHENS.

Witnesses:
W. REES EDELEN,
WM. G. DUNNE.